United States Patent Office 2,778,721
Patented Jan. 22, 1957

2,778,721

COLCHICOSAMIDES, METHOD OF MAKING, AND COMPOSITIONS CONTAINING SAME

Paul Bellet, Paris, France, assignor to UCLAF, a corporation of France

No Drawing. Application December 18, 1953,
Serial No. 399,180

Claims priority, application France February 25, 1953

17 Claims. (Cl. 71—2.5)

The present invention relates to new derivatives of colchicoside and more particularly to colchicosamides, and to a method of making same.

In co-pending application Serial No. 332,115 of Paul Bellet and Gaston Amiard, relating to a new glucoside colchicoside and a method of making same, which was filed January 19, 1953, now Pat. No. 2,734,014, a new crystalline glucoside derived from plants of the genus Colchicum called "colchicoside" is described. The process of preparing said compound is disclosed in great detail in said co-pending application. It consists in principle in contacting plant material derived from the genus Colchicum with a first extraction solvent, preferably a halogenated lower aliphatic hydrocarbon, such as chloroform, tetrachloro ethane, trichloro ethylene and the like to dissolve colchicine and the other active Colchicum principles but not colchicoside, and then contacting said extracted plant residue with a second extraction solvent, preferably water, a lower aliphatic alcohol, a mixture of water and a lower aliphatic alcohol, or a mixture of a lower aliphatic alcohol with a halogenated lower aliphatic hydrocarbon, such as a mixture of ethanol and chloroform, to dissolve said colchicoside, separating said solution from the contacted plant material, and recovering colchicoside from said solution. Colchicoside corresponds to the general formula $C_{27}H_{33}O_{11}N$.

According to the above mentioned co-pending patent application colchicoside is also obtained by condensing the Colchicum substance C which is one of the physiologically active Colchicum principles, with an α-acylo halogeno glucose, such as α-aceto bromo glucose, to produce the tetraacylated colchicoside, and saponifying said tetraacylated colchicoside to form colchicoside. Further study of said colchicoside has established the following structural formula for said compound:

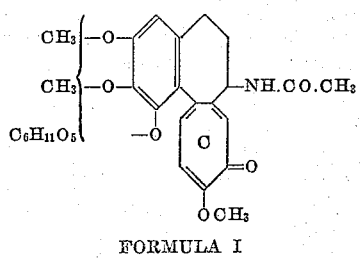

FORMULA I

It melts at 192–195° C. (in a capillary tube) and at 216–218° (on the Maquenne block). Its aqueous solution is strongly levorotatory, namely $[\alpha]_D^{15}$: $-360° \pm 3°$ (c.: 1% in water). This glucoside exhibits a low toxicity and is 50 times less toxic than colchicine. Otherwise it has about the same physiological properties, especially in its ability to inhibit cell division and to cause doubling of chromosomes or polyploidism without such cell division. On account of its low toxicity it finds extensive application in biology, agriculture, and industry. In agriculture, for instance, it is of great importance in creating various types of improved vegetables and other agricultural plants. For this purpose the soil on which such plants are cultivated may be treated with aqueous solutions of said colchicoside. One may, of course, also subject the seeds themselves to such a treatment with aqueous solutions of said compound. Colchicoside also possesses very interesting pharmacodynamic properties.

One object of the present invention is to provide, as new compounds, useful in industry and for other purposes, derivatives of said colchicoside which differ from colchicoside by the presence of a substituted or unsubstituted amino group in the tropolone ring C of its molecule. Said amino group replaces the methoxyl group present in said tropolone ring.

Another object of this invention is to provide a simple and effective process of making such new derivatives of colchicoside whereby the methoxyl group in the tropolone ring thereof is replaced by an amino group.

Still another object of this invention is to provide new preparations containing said new colchicosamides as such or diluted with solvents or other diluting agents, said preparations representing useful antimitotic agents used in industry and agriculture, for instance, for causing polyploidism.

Other objects of this invention and advantageous features thereof will become apparent as the description proceeds.

The new compounds, hereinafter designated as "colchicosamides," correspond to the following formula:

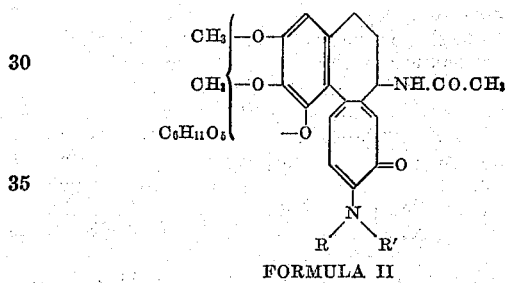

FORMULA II

In said formula R indicates hydrogen, an alkyl, hydroxy alkyl, or aralkyl radical while R' represents hydrogen, an alkyl, hydroxy-alkyl, or aralkyl radical, an amino group or an aryl amino group. R and R' in said formula may form, together with the nitrogen atom, a heterocyclic nucleus. Especially suitable compounds are those wherein R and R' represent lower saturated, straight-chain alkyl radicals containing up to six carbon atoms.

The simplest compound of this type wherein R and R' are hydrogen is the colchicosamide. It is designated by said term in accordance with conventional terminology. Consequently the new compounds according to the present invention are generally called "colchicosamides." They might, however, also be considered as trop-aminones.

The colchicosamides according to this invention are compounds which crystallize from alcohol in yellow prisms. Frequently they retain varying amounts of solvent as solvent of crystallization. They loose said solvent of crystallization only on heating at 100° C. in a vacuum. Quite a number of compounds of this series are soluble in water. Most of them are soluble in dilute or concentrated acids and dilute alkalies and in aqueous alcohol. They are only slightly soluble or insoluble in absolute alcohol and in organic solvents.

The method of preparing said compounds consists in reacting a solution of colchicoside in a suitable solvent with an amino compound of the following formula:

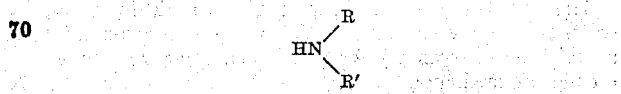

wherein R and R' indicate the same groups and radicals as stated above. The simplest amino compound of this type is ammonia which yields colchicosamide. Primary or secondary aliphatic or aralkyl amines, heterocyclic compounds with a reactive nitrogen atom in the heterocyclic nucleus, hydrazine, or aryl hydrazines may also be used. They yield substituted colchicosamides.

The solvent in which the reaction is carried out may be water or an organic solvent wherein colchicoside is soluble, such as an alcohol. Mixtures of alcohols and water may also be used. The amino compound itself employed as the one reaction component may serve as solvent. Water, however, is the most preferred solvent. The amino compound may also be dissolved in a suitable solvent of the type above disclosed before it is added to the solution of colchicoside.

The reaction of colchicoside and the amino compound is preferably carried out at room temperature. The reaction components are allowed to remain in contact until the yield of the reaction product is practically quantitative. In general, this is achieved after about 20 hours. Should the amino base not enter into reaction with colchicoside at room temperature, the temperature of the reaction mixture is increased. Due to the high volatility of the amino compound, however, especially when working with aliphatic bases, it is then necessary to work under pressure. Of course, in each case the proper reaction temperature must be selected in accordance with the temperature at which the reaction product decomposes and should be substantially lower than such decomposition temperature.

After the reaction is complete, the excess of volatile amino base is removed preferably by vacuum distillation. In case the amino base is only slightly volatile the excess of said base is eliminated by treating the reaction mixture with a suitable solvent adapted to dissolve said base without dissolving the colchicosamide, such as chloroform, ether, diisopropyl ether. The extraction residue which represents the reaction product is preferably purified by recrystallization, preferably from a lower aliphatic alcohol.

The following examples serve to illustrate the invention without, however, limiting the same thereto. The analytical data and the rotatory power were determined by analyzing and testing the products which were freed from solvent by drying in a vacuum. The melting points were determined by heating the compounds in a capillary tube. The absolute error on determining the rotatory power is about ±3°.

*Example 1*

COLCHICOSAMIDE (FORMULA II; R AND R': H)

A solution of 3 g. of colchicoside in 10 cc. of water is introduced into 300 cc. of a 17 N aqueous ammonia solution. The mixture is allowed to stand at 20° C. for 20 hours and is then distilled to dryness in a vacuum. The resulting resin (3 g.) is recrystallized from ethanol yielding 2.366 g. of yellow prisms, melting point: 199° C. The mother liquors are evaporated to dryness and the residue is recrystallized from methanol. In this manner further 0.346 g. of the same compound are recovered. The overall yield is about 92%.

On recrystallization from ethanol pure colchicosamide is obtained in yellow prisms arranged in rosettes. Melting point: 201–203° C.; rotatory power $[\alpha]_D^{20}$: —420° (c.: 1% in water).

Analysis.—Calculated for $C_{26}H_{32}O_{10}N_2$: 58.6% C; 6.01% H; 5.26% N. Found: 58.8% C; 6.2% H; 5.39% N.

The new compound is very readily soluble in water, soluble in dilute aqueous acids and in ammonia, and soluble in the cold in about 100 parts by volume of ethanol or methanol.

*Example 2*

N-MONOMETHYL COLCHICOSAMIDE (FORMULA II; R: CH₃, R': H)

1 g. of colchicoside dissolved in the minimum amount of water is placed in a heavy-walled glass tube. 2.2 g. of methylamine dissolved in 12 cc. of 90% ethanol, i. e., a solution containing 183 mg. of methylamine per cc. solution determined by acidimetric titration are added to said solution. The tube is sealed and heated at 100° C. for 16 hours. After cooling, the tube is opened and the resulting yellow clear solution is evaporated to dryness in a vacuum. The residue is recrystallized from boiling ethanol and yields 0.932 g. of methyl colchicosamide in thick yellow clear prisms of the form of lozenges. Melting point: 231–235° C. Yield of crude product: 93%.

Said crude product is recrystallized by dissolving it in as little warm water as possible and 10 parts by volume of absolute ethanol are added. Crystallization rapidly takes place with a yield of 90%. Melting point: 232–233° C. The rotatory power of said compound is $[\alpha]_D^{20}$: —604° (c.: 1% in water).

Analysis.—Calculated for $C_{27}H_{34}O_{10}N_2$: 59.3% C; 6.26% H; 5.13% N. Found: 59.5% C; 6.4% H; 5.0% N.

The compound is soluble in 3 parts by volume of water, very readily soluble in dilute aqueous acids and in dilute aqueous alkalies, very little soluble in alcohol, insoluble in ether, acetone, benzene, and chloroform.

*Example 3*

N-MONO-ETHYL COLCHICOSAMIDE (FORMULA II; R: C₂H₅, R': H)

1 g. of colchicoside is dissolved in 2 cc. of 50% ethanol and 10 cc. of an 8.8 N ethylamine solution in ethanol are added. The mixture is placed in a heavy-walled glass tube which is sealed and heated for 16 hours at 100° C. After cooling, the tube is opened and the solution is concentrated by evaporation in a vacuum. As soon as the volume is reduced to about 3 cc., spontaneous crystallization sets in and rectangular prisms are obtained. The mixture is cooled with ice, filtered, washed with absolute ethanol, and dried. 0.879 g. are obtained which sinter at 239° C. and melt at 242–243° C. Yield: 88%.

The crude product is recrystallized from 35 cc. of boiling alcohol yielding 0.836 g. of a yellow product melting slowly in a capillary tube at 246–249° C. The rotatory power of the compound is $[\alpha]_D^{20}$: —568° (c.: 0.85% in water); $[\alpha]_D^{20}$: —210° (c.: 0.9% in 50% alcohol). Yield: 83%.

Analysis.—Calculated for $C_{28}H_{36}O_{10}N_2$: 60.0% C; 6.5% H; 5.0% N. Found: 59.8% C; 6.4% H; 5.0% N.

The compound is very readily soluble in water, but only slightly soluble in ethanol, even in boiling ethanol, insoluble in benzene and ether, and soluble in acids and dilute aqueous alkalies.

*Example 4*

N-PROPYL COLCHICOSAMIDE (FORMULA II; R: C₃H₇; R': H)

10 cc. of a 4 N solution of n-propylamine in ethanol are added to 1 g. of colchicoside dissolved in 50% ethanol and the mixture is placed in an elongated Pyrex glass tube. The tube is sealed and is kept in an oven at 100° C. for 16 hours. The golden yellow liquid is evaporated. The residue is twice extracted with boiling alcohol, evaporated, and finally crystallized in 5 cc. of ethanol. 0.774 g. of rectangular platelets are obtained as a first fraction which melt in a capillary tube between 244° C. and 249° C. Yield: 74%.

The product is twice recrystallized without any significant change in melting point, i. e., it melts thereafter at 248–251° C. Propyl colchicosamide is only slightly soluble in cold water and in cold alcohol; it is, however, readily dissolved in dilute acids.

Rotatory power:

$[\alpha]_D^{15}$: —373° ±3° (c.: 1% in N/10 HCl)
$[\alpha]_D^{15}$: —214° ±3° (c.: 1% in 50% ethanol)

Analysis.—Calculated for $C_{29}H_{38}O_{10}N_2$: 60.61% C; 6.67% H; 4.87% N. Found: 60.4% C; 6.7% H; 4.9% N. Loss of weight on keeping it at 100° C. in a vacuum: 1.2%.

Example 5

N-MONO-N-BUTYL COLCHICOSAMIDE (FORMULA II;
R : $C_4H_9$ ; R' : H)

1 g. of colchicoside dissolved in 2 cc. of 50% ethanol and 10 cc. of a 4.5 N solution of n-butylamine in ethanol are introduced in a heavy-walled glass tube. The tube is sealed and heated at 100° C. for 16 hours. After cooling, the contents of the tube are evaporated in a vacuum and the residue is crystallized from absolute ethanol. After filtering and washing with cold alcohol, 0.848 g. of a crude product melting at 240–249° C. (with decomposition) are obtained. Yield: 81%.

On recrystallization from absolute alcohol, small rectangular yellow prisms are obtained melting slowly at 244–245° C. (in a capillary tube). The pure compound is insoluble in water, only slightly soluble in ethanol, insoluble in acids and dilute aqueous alkalies. Rotatory power $[\alpha]_D$: —201° (c.: 1% in 50% ethanol).

Analysis.—Calculated for $C_{30}H_{40}O_{10}N_2$: 61.21% C; 6.85% H; 4.75% N. Found: 61.2% C; 6.8% H; 4.8% N.

Example 6

N-MONO-N-AMYL COLCHICOSAMIDE (FORMULA II;
R : $C_5H_{11}$ ; R' : H)

1 g. of colchicoside is dissolved in 1 cc. of water and 1 cc. of absolute ethanol. 10 cc. of a 2.6 N solution of n-amyl-amine in ethanol is added thereto. The mixture is placed in a heavy-walled Pyrex glass tube, the open end of which is sealed, and is kept therein at 100° C. for 16 hours. Thereafter the excess amine is distilled off in a vacuum whereby several times during said distillation absolute alcohol is added to carry along the non-reacted amine. Finally the mixture is evaporated to dryness and the residue is taken up in 7 cc. of ethanol. The solution is allowed to stand overnight in ice. The resulting crystals are filtered off and are washed with cold alcohol and subsequently with ether. Sulfur-yellowish fine needles with truncated ends are obtained in an amount of 0.555 g., after drying. The crude product melts at a capillary tube at 216–218° C. (not corrected). The mother liquors are concentrated and yield a second batch of crystals in the amount of 0.366 g. The total yield is 83%.

The first fraction is recrystallized from 5 cc. of warm absolute ethanol. 0.543 g. of the pure compound are obtained which melt at 217–220.5° C. (not corrected). The pure amide is soluble in warm alcohols, practically insoluble in water, even in warm water, soluble in dilute aqueous acids, and insoluble in ether and benzene.

The rotatory power of the dry compound is $[\alpha]_D^{20}$: —203° (c.: 0.98% in 50% ethanol).

Analysis.—Calculated for $C_{31}H_{42}O_{10}N_2$: 61.78% C; 7.02% H; 4.65% N. Found: 61.8% C; 7.1% H; 4.7% N.

Example 7

N-MONO-N-HEXYL COLCHICOSAMIDE (FORMULA II;
R : $C_6H_{13}$ ; R' : H)

The procedure is the same as described in Example 5 whereby, however, 1 g. of colchicoside is dissolved in 2 cc. of ethanol and the solution is mixed with 10 cc. of a 2.5 N solution of n-hexylamine in ethanol. The resulting resinous reaction product is dissolved in warm absolute ethanol and the solution is allowed to stand overnight in ice. Lemon-yellowish rectangular needles are obtained, after drying, in an amount of 0.858 g. which melt at 174–176° C.

The crude product is recrystallized from warm absolute alcohol and yields 0.672 g. of elongated rectangular needles melting at 172–175° C.

The compound is soluble in water, acids and dilute aqueous alkalies, little soluble in cold alcohol, and insoluble in ether, benzene, and chloroform. Its rotatory power is $[\alpha]_D^{20}$: —196° (c.: 0.9% in 50% ethanol); $[\alpha]_D^{20}$: —233° (c.: 0.94% in water).

Analysis.—Calculated for $C_{32}H_{44}O_{10}N_2$: 62.3% C; 7.18% H; 4.54% N. Found: 62.3% C; 7.0% H; 4.5% N.

Example 8

N,N-DIMETHYL COLCHICOSAMIDE (FORMULA II;
R : $CH_3$ ; R' : $CH_3$)

0.72 g. of colchicoside are dissolved in 1 cc. of 50% ethanol. 8 cc. of an 8 N solution of dimethylamine in alcohol are added thereto. The mixture is enclosed in a stoppered glass tube and is kept lukewarm in a water bath to avoid crystallization of the oside. Thereby the solution becomes slightly colored. The mixture is then allowed to stand at 10° C. for 48 hours. Slowly crystals are formed while the reaction takes place. The crystals are filtered off, washed with cold ethanol and subsequently with ethyl acetate. After drying, 0.5 g. of a product are obtained which melts at 183–185° C. (in a capillary tube). Yield: 67% of the theoretical quantity.

The mother liquors are evaporated to dryness and yield, after dissolving the resulting residue in 5 cc. of boiling ethanol, a second batch of chrome yellow prisms in an amount of 0.218 g. which sinter at 182° C. and melt at 186–188° C. Yield: 30%. The total yield, therefore, is almost quantitative, i. e., 97%.

For recrystallization, the amide is dissolved in as little water as possible and the solution filtered. 12 cc. of absolute ethanol are added to the filtrate and the mixture is allowed to crystallize. The crystals are filtered off, washed with ice-cold ethanol, and dried. The resulting pure compound melts in the capillary tube at 186–189° C. Rotatory power $[\alpha]_D^{15}$:—17.4° (c.:1% in 50% ethanol).

Analysis.—Calculated for $C_{28}H_{36}O_{10}N_2$: 59.99% C; 6.47% H; 5.0% N. Found: 59.5% C; 6.4% H; 5.0% N.

The pure compound is soluble in 1 part by volume of water, very readily soluble in acids and dilute aqueous alkalies, very little soluble in cold absolute alcohol and chloroform, little soluble in acetone, and insoluble in ether and benzene.

Example 9

N,N-DIETHYL COLCHICOSAMIDE (FORMULA II;
R : R' : $C_2H_5$)

1.2 g. of colchicoside are dissolved in 10 cc. of a 3 N solution of diethylamine in ethanol. The mixture is heated in a sealed tube at 100° C. for 3½ hours. The reaction mixture is worked up in the same manner as described in the preceding examples.

1.143 g. of a product melting at 169–170° C. (in a capillary tube) are obtained as a first fraction. Rotatory power $[\alpha]_D$:+169° (c.: 1% in water). Yield: 88.5%.

This crude product is twice recrystallized and yields thereby 0.898 g. of the pure amide melting at 177° C. Its rotatory power is $[\alpha]_D$:+176° (c.:1% in water).

The various mother liquors yield a second fraction in an amount of 0.139 g., melting at 174–175° C.; rotatory power $[\alpha]_D$:+131° (c.:1% in water).

Analysis of the first fraction after having been twice recrystallized.

Calculated for $C_{30}H_{40}O_{10}N_2$: 61.21% C; 6.85% H; 4.75% N. Found: 60.9% C; 6.9% H; 4.8% N.

Example 10

N-MONO-ETHANOL COLCHICOSAMIDE (FORMULA II;
R : $CH_2.CH_2OH$ ; R' : H)

1 g. of colchicoside, 5 cc. of absolute ethanol, and 3 cc. of monoethanolamine are introduced into a glass tube.

The tube is sealed and kept at 100° C. Solution is achieved with some difficulty. The temperature of the mixture is maintained at 100° C. for sixteen hours. The residue obtained on vacuum distillation is taken up in 7 to 8 cc. of boiling ethanol. The solution is cooled with ice. Crystallization sets in quite slowly. Overnight, however, beautiful octagonal crystals separate. They are filtered, washed, and dried. 0.802 g. of a product are obtained which melts, in the capillary tube, at 232–233° C. Yield: 76.5%.

On recrystallization from absolute alcohol, rosettes of prisms are fairly rapidly obtained. 0.652 g. of a pure compound melting at 234–237° C. (in the capillary tube) are obtained.

The pure compound is soluble in water, methanol, ethanol, hydrochloric acid, and dilute sodium hydroxide solution, and insoluble in chloroform, ether, and benzene. Rotatory power $[\alpha]_D^{15}$: —205° C. (c.: 1% in 50% ethanol); $[\alpha]_D^{15}$: —495° (c.: 1% in water); $[\alpha]_D^{15}$: —330° (c.: 1% in N/10 hydrochloric acid).

Analysis.—Calculated for $C_{28}H_{36}O_{11}N_2$: 58.3% C; 6.3% H; 4.86% N. Found: 58.2% C; 6.2% H; 4.9% N.

Example 11

N,N-DIETHANOL COLCHICOSAMIDE (FORMULA II; R : R' : $CH_2.CH_2OH$)

A solution of 1 g. of colchicoside, 3.5 cc. of diethanolamine, and 6 cc. of 95% ethanol is heated in a sealed tube at 100° C. for 16 hours. The solution is then evaporated in a vacuum and the evaporation residue is thoroughly extracted three times, each time with 20 cc. of chloroform. The insoluble residue is recrystallized from a few cc. of warm absolute alcohol. After allowing the alcoholic solution to stand at 0° C., the resulting prisms, arranged in rosettes, are filtered, washed with ether, and dried.

As a first fraction, 0.595 g. of a product are obtained which melts at 215° C. (in a capillary tube).. This crude product is twice recrystallized whereby 0.309 g. of the pure compound melting at 234–235° C. (in a capillary tube) are obtained. Rotatory power $[\alpha]_D^{15}$: —505° (c.: 1% in water). Yield of the crude product: 52.5%.

The pure amide is very readily soluble in water, acids, and dilute alkalies, very little soluble in cold ethanol, and insoluble in organic solvents.

Analysis.—Calculated for $C_{30}H_{40}O_{12}N_2$: 58.0% C; 6.5% H; 4.51% N. Found: 57.9% C; 6.3% H; 4.7% N.

Example 12

COLCHICOSIDE HYDRAZIDE (FORMULA II; R : H ; R' : $NH_2$)

1 g. of colchicoside is dissolved in a mixture of 10 cc. of absolute ethanol and 4 cc. of a 20 N solution of hydrazine hydrate in water. The mixture is allowed to stand at room temperature for 16 hours and is diluted by the addition of 40 cc. of ethanol. A heavy oily layer settles out. Said oily layer yields rectangular platelets after addition of a few cc. of ether and allowing the mixture to stand for one hour. Said crystals are very slightly soluble in chloroform-ethanol (2:1) and differ in this respect from colchicoside. The following amounts of crude product are obtained.

First fraction: 0.585 g. corresponding to 58.5% of the theoretical yield.

After concentrating by evaporation the mother liquors and cooling with ice, a second fraction results amounting to 0.275 g. corresponding to 27.5% of the theoretical yield. Total yield of crude product: 86%.

To recrystallize said crude product, it is dissolved in as little cold water as possible and is diluted by the addition of 10 parts by volume of absolute alcohol. Thereby small yellow and dense prisms precipitate rapidly.

The first fraction yields 0.579 g., melting point: 233° C. and the second fraction 0.150 g., melting point: 226° C., the melting points being determined in a capillary tube.

The compound is dried at 120° C. in a vacuum. Rotatory power $[\alpha]_D^{15}$: —408° (c.: 1.04% in water).

The hydrazide of colchicoside is very readily soluble in water, methanol, dilute hydrochloric acid, insoluble in ethanol, chloroform, and ether. It has a strong reducing effect upon Nessler's reagent.

Analysis.—Calculated for $C_{26}H_{33}O_{10}N_3$: 57.0% C; 6.08% H; 7.68% N. Found: 56.8% C; 6.2% H; 7.7% N.

Example 13

PHENYL HYDRAZIDE OF COLCHICOSIDE (FORMULA II; R : H ; R' : —$NH.C_6H_5$)

A solution of 1 g. of colchicoside in 10 cc. of alcohol is added to 3 cc. of phenyl hydrazine. The mixture is heated in a sealed tube at 100° C. for 16 hours. Thereafter the contents of the tube are evaporated, the oily residue is three times triturated with a mixture of ether and chloroform (1:1), each time with 10 cc. The residue is freed from the solvent by decanting and the remaining hard resin is dissolved in 1.5 cc. of 50% ethanol. The solution is diluted by the addition of 9 cc. of absolute ethanol and is cooled by means of ice to cause crystallization. The crystals are filtered off and washed with ether. 0.780 g. of a product are obtained which melts at 235–237° C. (in the capillary tube). Yield: 68%.

The crude product is recrystallized from alcohol as described above and yields the pure compound melting at 237–238° C. (in a capillary tube). Rotatory power $[\alpha]_D$: —176° (c.: 1% in N/10 hydrochloric acid).

The crystals are insoluble in water and absolute ethanol.

Analysis.—Calculated for $C_{32}H_{37}O_{10}N_3$: 61.64% C; 5.98% H; 6.74% N. Found: 61.6% C; 6.2% H; 61.4% C; 6.3% H; 6.6% N.

Determination of two methoxyl groups: Calculated—9.96%. Found—9.8%.

Example 14

N-BENZYL COLCHICOSAMIDE (FORMULA II; R : —$CH_2C_6H_5$ ; R' : H)

A solution of 1.1 g. of colchicoside in 4 cc. of benzylamine and 6 cc. of absolute ethanol are heated at 100° C. for 16 hours, in a sealed glass tube. As soon as the mixture is heated to said temperature, a yellow clear crystalline precipitate begins to form. It is filtered off, washed with alcohol, and dried in the cold in a vacuum. In this manner a pale yellowish dense powder is obtained which is insoluble in water, ethanol, methanol, ether, chloroform, dilute sodium hydroxide solution, N hydrochloric acid solution, and also in pyridine. 1.239 g. of the new amide are obtained which melt at 280–281° C. (in a capillary tube, not corrected). Yield: 98%.

This compound could not be recrystallized; therefore, the crude product without further purification was analyzed.

Analysis.—Calculated for $C_{33}H_{38}O_{10}N_2$: 63.7% C; 6.15% H; 4.5% N. Found: 63.9% C; 6.30–6.0% H; 4.7% N. Solvent: None.

Example 15

N-BENZHYDRYL COLCHICOSAMIDE

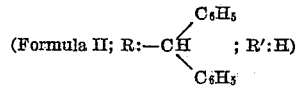

(Formula II; R:—CH(C_6H_5)(C_6H_5) ; R':H)

1 g. of colchicoside, 4 cc. of benzhydrylamine, and 6.5 cc. of 90% ethanol are placed in a glass tube. The tube is sealed and heated at 100° C. for 16 hours. The contents of the tube are then evaporated to dryness. The residue is thoroughly extracted by trituration with ether. The insoluble residue is filtered off and again rinsed with ether. The dried pulverulent extracted residue is dissolved in 4 cc. of hot ethanol. Prisms crystallize immediately from said solvent. The solution is cooled with ice, and the crystals are filtered off and dried. 1.190 g. melting at 190–192° C. (in the capillary tube) are obtained. Yield: 93%.

The compound is insoluble in water, ethanol, acetone, ether, ethyl acetate, chloroform (in the cold as well as while hot), N hydrochloric acid, N ammonia, and N sodium hydroxide solution. It is soluble in pyridine. The compound could not be recrystallized.

*Analysis.*—Calculated for $C_{39}H_{42}O_{10}N_2$: 67.0% C; 6.06% H; 4.01% N. Found: 67.0% C; 6.0% H; 4.1% N.

*Example 16*

N-PHENYL ISOPROPYL COLCHICOSAMIDE

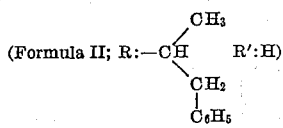

1 g. of colchicoside dissolved in 10 cc. of a 2.2 N solution of 1-phenyl-2-amino propane in ethanol are heated in a sealed tube to 100° C. for 16 hours. Thereafter, the reaction mixture is evaporated to dryness in a vacuum and the residue is dissolved in sufficient amounts of a mixture of ethanol and ether (1:1). Ethyl acetate is added to said solution until it becomes slightly turbid whereupon crystallization sets in. 0.268 g. of a first fraction melting at 206–208° C. (in a capillary tube) and 0.290 g. of a second fraction melting at 204–207° C. (in a capillary tube) are obtained. Total yield: 47%.

On recrystallization from hot absolute alcohol clusters of yellow needles melting at 213–215° C. (in a capillary tube) are obtained. The compound is soluble in alcohol, especially in hot alcohol, and in dilute acids; it is insoluble in water and ether. Its rotatory power is $[\alpha]_D$: —242° (c.: 0.97% in 50% ethanol); $[\alpha]_D$: —280° (c.: 0.9% in N/10 hydrochloric acid).

*Analysis.*—Calculated for $C_{35}H_{42}O_{10}N_2$: 64.60% C; 6.51% H; 4.31% N. Found: 64.6% C; 6.5% H; 4.4% N.

*Example 17*

N,N - CYCLOPENTAMETHYLENE COLCHICOSAMIDE (FORMULA II; R+R': —CH₂—CH₂—CH₂—CH₂—CH₂—)

1 g. of colchicoside, 3.5 cc. of piperidine, and 6.5 cc. of absolute ethanol are placed into a tube which is sealed and heated at 100° C. for 16 hours. A golden yellow solution is obtained which is evaporated to dryness. The residue crystallizes instantaneously on trituration in the cold with absolute ethanol yields 1.011 g. of golden yellow square platelets, melting at 201–202° C. (in a capillary tube). Yield: 92%.

On recrystallization from 35 parts by volume of boiling absolute ethanol 0.815 g. of a pure compound are obtained which melt at 201–202° C. (in a capillary tube). Rotatory power $[\alpha]_D$: —124° (c.: 1% in 50% ethanol); $[\alpha]_D$: —237° (c.: 1% in N/10 hydrochloric acid).

The compound is soluble in methanol, 50% ethanol, N/10 hydrochloric acid, and only slightly soluble in water and absolute ethanol. It is insoluble in chloroform, ether, and benzene.

*Analysis.*—Calculated for $C_{31}H_{40}O_{10}N_2$: 61.98% C; 6.71% H; 4.67% N. Found: 62.0% C; 6.9% H; 5.0% N.

*Example 18*

COLCHICOSIDO MORPHOLIDE

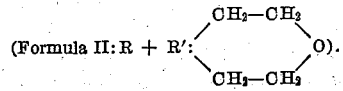

A solution of 1 g. of colchicoside in 1 cc. of water is placed into a heavy-walled "Pyrex" glass tube. 3 cc. of morpholine dissolved in 5 cc. of ethanol are added thereto. The tube is sealed and heated in an oven at 100° C. for 16 hours. The content of the tube acquires a reddish brown color. The solvents are evaporated in a vacuum. The evaporation residue is thoroughly extracted with lukewarm ether (25–30° C.) and, after removing the ether, is dried. The residue is crystallized in 4 cc. to 6 cc. of ethanol. Thereby 0.764 g. of a product melting at 186–188° C. (in the capillary tube), corresponding to a yield of 70%, are obtained. A second crystallization from ethanol yields 0.624 g. of a product which, after it has been freed from its solvent of crystallization, melts at 190–195° C. (in the tube), $[\alpha]_D^{20}$: —170° ±3° (c.: 1% in 50% ethanol); —243° ±3° (c.: 1% in water). The compound is soluble in water, ethanol, methanol, and a mixture of chloroform and ethanol. It is insoluble in ether and chloroform.

Elementary analysis of a product containing about 7% of solvent of crystallization, yields the following values: $C_{30}H_{38}O_{11}N_2$: Calculated, 59.8% C; 6.36% H; 4.65% N. Found, 59.3% C; 6.2% H; 6.4% H; 4.6% N.

There may be used equimolecular amounts of other amino compounds in the place of the amino compounds employed as the one reaction component in the preceding examples. In the place of methylamine, dimethylamine, and other lower alkyl amines the reaction may be carried out with other primary amines, such as isopropylamine, isobutylamine, tertiary butylamine, the various isomeric amyl amines, hexylamines, or with other secondary aliphatic amines, such as dipropylamine, dibutylamine. Ethanol amine may be replaced by other alkanol amines, such as propanol amines, butanol amines, pentanol amines, and also by di-propanol amine. As aralkylamines there may be used other phenyl alkylamines, such as phenyl ethylamine, phenyl propylamine, p-methyl benzylamine. Unsaturated alkylamines may also be used, such as allylamine.

In the place of phenyl hydrazine there may be employed other aryl hydrazines, such as the tolyl hydrazines, the naphthyl hydrazines.

In general, the reaction may be carried out with any primary or secondary amine capable of substituting the methoxyl group present in the tropolone ring C (Formula I) of the colchicoside molecule.

Many other changes and variations in the reaction conditions, the temperature and duration, the solvents used, the methods employed for working up the reaction mixture and for purifying the new colchicosamide, and the like, may be made by those skilled in the art in accordance with the principles set forth herein and in the claims annexed hereto.

The following examples serve to illustrate the preparation of such new compositions comprising colchicosamides which may find application in agriculture, and for other purposes. Such compositions, however, are not limited to said examples.

*Example 19*

A 1% aqueous colchicosamide solution is prepared and used in agriculture as concentrate for the preparation of solutions of desired concentration to be used in the treatment of seeds to produce polypolidism. Such a solution may also be applied to the soil on which plants to be treated are cultivated.

*Example 20*

1 g. of N-phenyl isopropyl colchicosamide, obtained according to Example 16, is dissolved in 100 cc. of dilute N hydrochloric acid. The solution is mixed with 900 cc. of citrate buffer solution according to Sorensen and thereby is adjusted to a pH of about 6.0. The resulting slightly acid solution contains 1 mg. of said colchicosamide per cc.

I claim:
1. As a new compound, a colchicosamide of the following formula

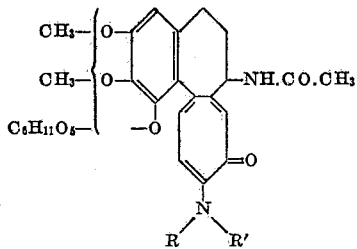

wherein R indicates a substituent selected from the group consisting of hydrogen, an alkyl, hydroxy alkyl, and aralkyl radical, and R' indicates a substituent selected from the group consisting of hydrogen, an alkyl, hydroxy alkyl, aralkyl radical, an amino group, and an aryl amino group, and R and R', together with the nitrogen atom, forming a heterocyclic nucleus.

2. N-methyl colchicosamide of the general formula $C_{27}H_{34}O_{10}N_2$ having a methyl amino group in neighboring position to the keto group in the tropolone ring of colchicoside, said N-methyl colchicosamide corresponding to the formula

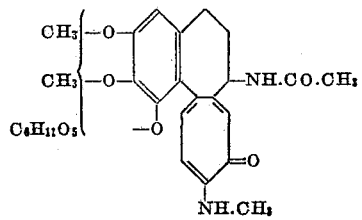

3. N-butyl colchicosamide of the general formula $C_{30}H_{40}O_{10}N_2$, having an n-butyl amino group in neighboring position to the keto group in the tropolone ring of colchicoside, said N-butyl colchicosamide corresponding to the formula

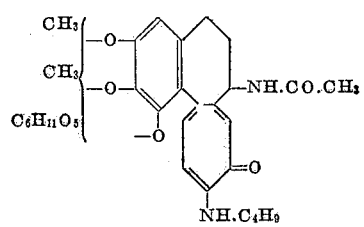

4. N,N-diethyl colchicosamide of the general formula $C_{30}H_{40}O_{10}N_2$ having a diethyl amino group in neighboring position to the keto group in the tropolone ring of colchicoside, said N,N-diethyl colchicosamide corresponding to the formula

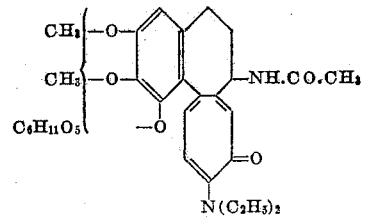

5. N-phenyl isopropyl colchicosamide of the general formula $C_{35}H_{42}O_{10}N_2$ having a phenyl isopropyl amino group in neighboring position to the keto group in the tropolone ring of colchicoside, said N-phenyl isopropyl colchicosamide corresponding to the formula

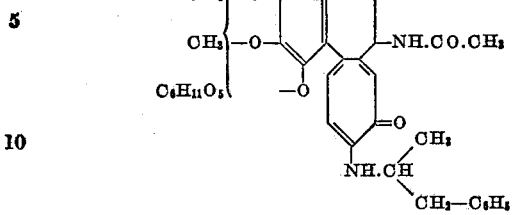

6. Colchicoside hydrazide of the general formula $C_{26}H_{35}O_{10}N_3$ having a hydrazino group in neighboring position to the keto group in the tropolone ring of colchicoside, said colchicoside hydrazide corresponding to the formula

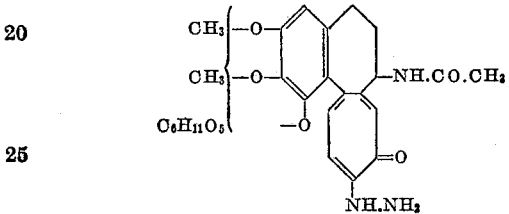

7. In a process of producing colchicosamides of the following formula

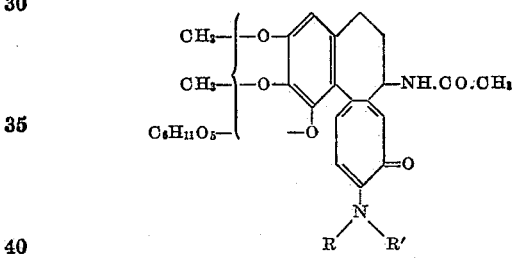

wherein R indicates a substituent selected from the group consisting of hydrogen, an alkyl, hydroxy alkyl, and aralkyl radical, and R' indicates a substituent selected from the group consisting of hydrogen, an alkyl, hydroxy alkyl, aralkyl radical, an amino group, and an arylamino group, and R and R', together with the nitrogen atom, forming a heterocyclic nucleus, the steps comprising reacting a solution of colchicoside with an amino compound of the formula

wherein R is a substituent selected from the group consisting of hydrogen, an alkyl, hydroxy alkyl, and aralkyl radical, and R' is a substituent selected from the group consisting of hydrogen, an alkyl, hydroxy alkyl, and aralkyl radical, an amino group, and an aryl amino group, and R and R', together with the nitrogen atom, forming a heterocyclic nucleus, to substitute the methoxy group present in the tropolone ring C of said colchicoside by said

group, said colchicoside being dissolved in a solvent selected from the group consisting of water, a water miscible alcohol, a mixture of such a water miscible alcohol and water, and the amino compound used as reaction component separating the solvent and unreacted amino compound from the resulting colchicosamide, and purifying the remaining colchicosamide.

8. In a process of producing colchicosamides according to claim 7, wherein the reaction is carried out at room temperature.

9. In a process of producing colchicosamides according to claim 7, wherein the reaction is carried out at elevated temperature, said temperature being substantially below the decomposition temperature of the reaction components and the resulting colchicosamide.

10. In a process of producing colchicosamides according to claim 9, wherein the reaction is carried out at elevated temperature under pressure.

11. In a process of producing colchicosamides according to claim 7, wherein the solvent and the unreacted amino compound are removed from the resulting colchicosamide by distillation.

12. In a process of producing colchicosamides according to claim 7, wherein the solvent and the unreacted amino compound are removed from the resulting colchicosamides by extraction by means of a solvent which does not dissolve said clochicosamide.

13. In a process of producing colchicosamides according to claim 7, wherein the remaining colchicosamide is purified by recrystallization from a lower aliphatic alcohol.

14. In a process of producing colchicosamides according to claim 13, wherein recrystallization is effected by means of an aqueous lower aliphatic alcohol.

15. An antimitotic composition for agricultural, and industrial use, comprising not less than 0.1 percent of a colchicosamide of the formula

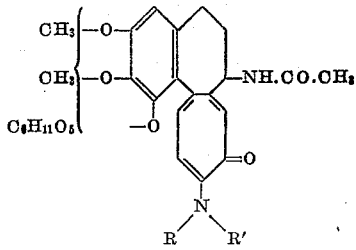

wherein R indicates a substituent selected from the group consisting of hydrogen, an alkyl, hydroxy alkyl, and aralkyl radical, and R' indicates a substituent selected from the group consisting of hydrogen, an alkyl, hydroxy alkyl, aralkyl radical, an amino group, and an arylamino group, and R and R', together with the nitrogen atom, forming a heterocyclic nucleus, and a significant amount of a carrier substance compatible with said colchicosamide.

16. An antimitotic composition for agricultural, and industrial use, comprising not less than 0.1 percent of a colchicosamide of the formula

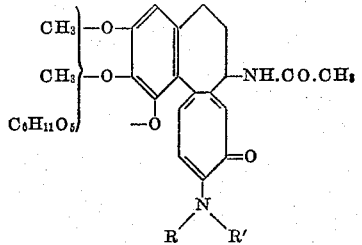

wherein R indicates a substituent selected from the group consisting of hydrogen, an alkyl, hydroxy alkyl, and aralkyl radical, and R' indicates a substituent selected from the group consisting of hydrogen, an alkyl, hydroxy alkyl, aralkyl radical, an amino group, and an arylamino group, and R and R', together with the nitrogen atom, forming a heterocyclic nucleus, and a significant amount of a liquid diluent.

17. An antimitotic preparation for agricultural and industrial use, comprising, as active ingredient, a colchicosamide of the following formula

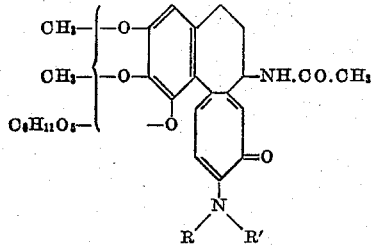

wherein R indicates a substituent selected from the group consisting of hydrogen, an alkyl, hydroxy alkyl, and aralkyl radical, and R' indicates a substituent selected from the group consisting of hydrogen, an alkyl, hydroxy alkyl, aralkyl radical, an amino group, and an arylamino group, and R and R', together with the nitrogen atom, forming a heterocyclic nucleus.

No references cited.